Figure 7:
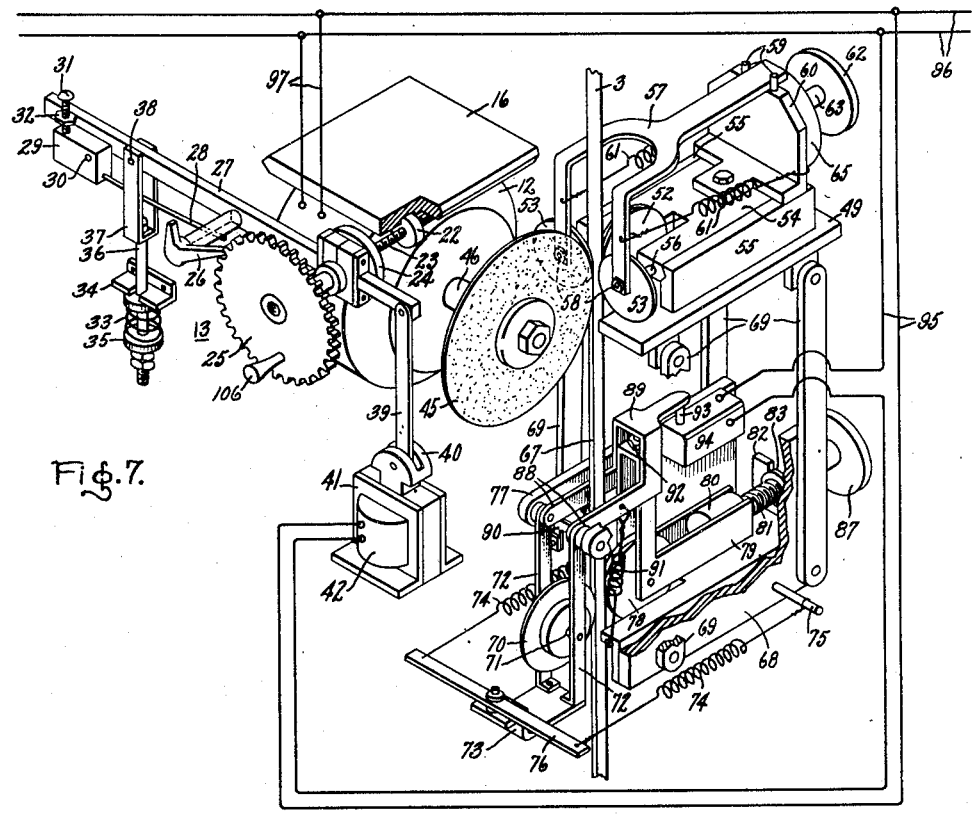

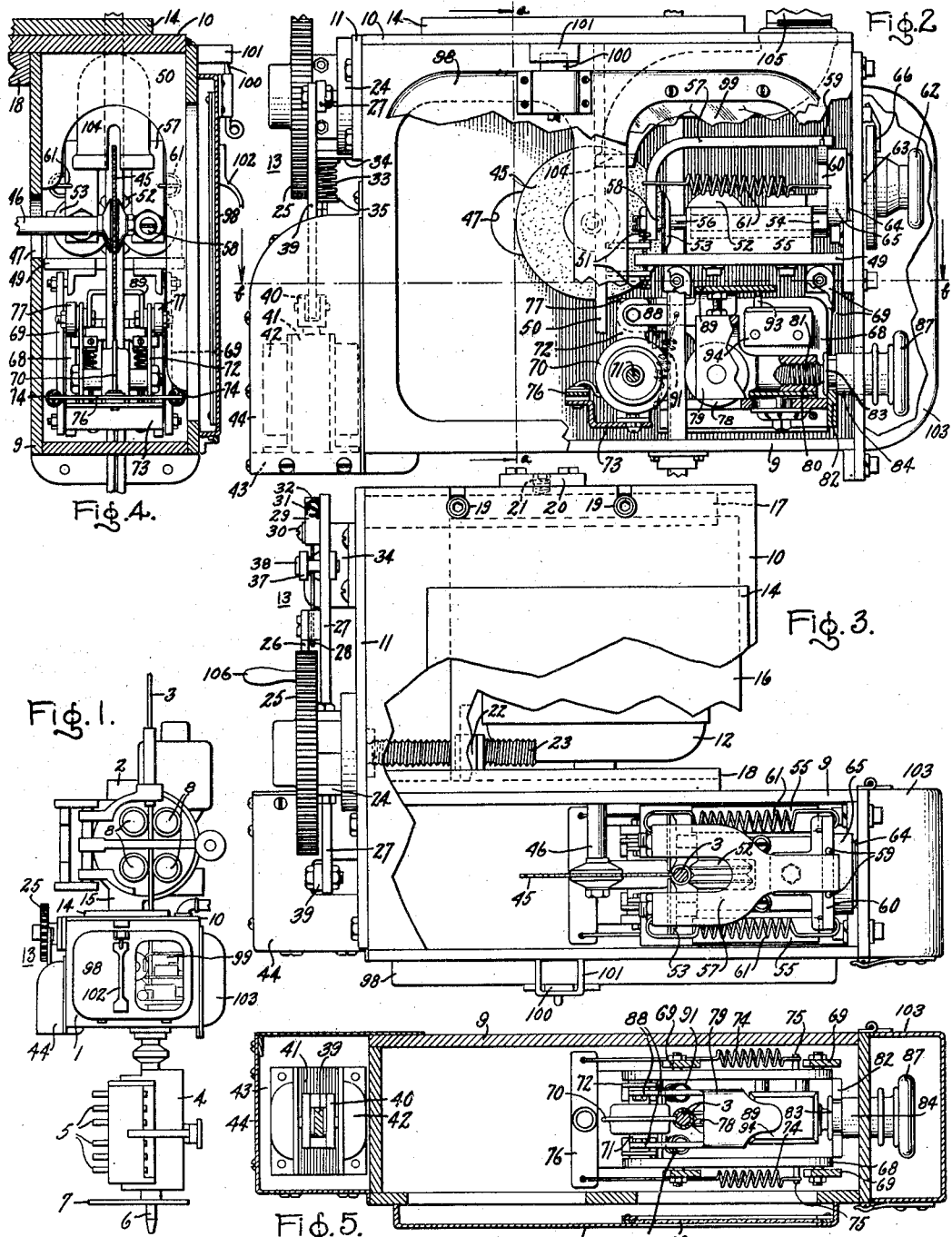

July 5, 1949.  W. E. WILSON  2,475,346
CUTTER MECHANISM

Filed July 25, 1947  2 Sheets-Sheet 2

Inventor:
Wayne E. Wilson,
by
His Attorney.

Patented July 5, 1949

2,475,346

UNITED STATES PATENT OFFICE 2,475,346

CUTTER MECHANISM

Wayne E. Wilson, Schenectady, N. Y., assignor to General Electric Company, a corporation of New York Application July 25, 1947, Serial No. 763,555

10 Claims. (Cl. 51—74)

My invention relates to cutter mechanisms which automatically maintain a work cut of predetermined depth by adjusting the cutter to compensate for its reduction in size due to wear. The cutter mechanism of my invention is particularly suited for cutting a longitudinal slot in flux coated electrodes so that welding current may be supplied thereto as they are fed toward the work by automatic arc welding machines.

In automatic arc welding machines, the arc is maintained by feeding an electrode toward the work as it is consumed by the arc. In fully automatic machines the rate of feed is controlled in accordance with a characteristic of the arc which varies with its departure from a desired operating condition, such, for example, as arc voltage. In some machines this feeding mechanism may also feed the electrode away from the work in order to accomodate inequalities in the work and provide means for striking the arc. In such automatic machines welding current is supplied to the arc by connecting one terminal of a source of supply to the work and the other terminal thereof to the welding electrode by means of a suitable contact mechanism.

The electrode is usually provided with a coating containing one or more materials having a beneficial effect on the arc and weld metal. These materials are commonly referred to as fluxes. In the heat of the arc they provide an atmosphere which stabilizes the arc and protects the fused electrode material and work parts from the surrounding atmosphere. In most cases the reaction products of the flux also form a slag which covers the weld and, like the slag in a furnace, has a beneficial effect on the molten weld metal.

When the electrode is bare or substantially bare, the welding current may be readily supplied to the electrode by a contact mechanism including one or more rolls or sliding contacts which are in engagement therewith. If, however, the electrode has a flux coating of substantial thickness thereon, some means must be provided for removing a portion of this coating extending lengthwise of the electrode to expose the core rod of the electrode to the contact mechanism. Alternatively, special electrodes having conductive portions extending through the flux coating thereon may be used with special contact mechanisms, but such special electrodes are expensive and usually, by reason of their nonuniform cross section, are not as useful as heavily coated electrodes having a core of uniform section provided with a substantially concentric coating of flux.

When using a cutter to remove part of the flux coating of the electrode, it is obviously desirable to remove as little thereof as is possible in exposing the core of the electrode to the contact mechanism. Since the magnitude of the welding current used for most welding operations is of considerable value, one or more brushes making a sliding contact with the work are usually employed. In the case of flux coated electrodes it is desirable to supply the welding current to the electrode at a point near its arcing terminal in order to use as much current as possible without overheating the electrode and damaging the flux coating thereon before it is introduced into the arc.

Preferably, the cutter mechanism should produce a narrow cut through the flux coating without tearing its cut edges or destroying the bond between the remaining flux coating and the core of the electrode. If the bond between the remaining coating and the core of the electrode is destroyed in whole or partially, the remaining coating will fall away from the core rod of the electrode before it serves its useful purpose at the arcing terminal thereof. Furthermore, torn or irregular cuts through the flux coating place an additional burden on the brushes and their supports in the contact mechanism and not only produce undesired wear but also impose an additional load on the feed motor of the arc welding head or that part of the automatic welding machine by means of which the electrode is fed to the arc.

If the cut into the coating of the electrode extends only to the surface of its core rod, a residue of flux remains on the core rod which reduces the surface contact between the core rod and the brushes of the contact mechanism. Furthermore the surface of the rod is not in itself as good a conductor as a freshly cut portion thereof, due, no doubt, to oxides thereon or the presence of residual lubricants resulting from a previous wire drawing operation. On the other hand, if the cut is deep enough to extend into the core rod and this cut is not smooth, like undesirable contact conditions prevail. Consequently, it is desirable to remove the coating and a thin surface layer of the core rod of the electrode by means of a cutter which will make a narrow cut with smooth side walls in the flux and a smooth contact surface on the core rod.

One suitable cutter for performing this operation is a thin, high speed grinding wheel. The size of the grinding wheel is, however, constantly reduced due to wear, and frequent adjustments thereof relative to the electrode are necessary if the desired uniform depth of cut is to be maintained. Furthermore, to provide for the possible eccentricity of the flux coating and the desired subsurface cutting of the core rod, the grinding wheel must cut into the core rod more than would otherwise be required.

Any automatic adjustment of the cutter to compensate for its wear and to produce the desired cut into the electrode must function without false response due to residual curvatures in the electrode or misalignment of its component parts. If, the electrode is of long length and supplied from a coil, the portion withdrawn from the coil will have a fixed or residual curvature therein. If, on the other hand, the electrode is made by joining together short lengths of electrode material, the component parts of the resulting electrode may not be in true alignment with one another. This residual curvature of the electrode, or the misalignment of its parts, or both in combination make it very difficult to gauge the depth of the cut produced in the electrode. If the electrode is rigidly held and guided as it leaves the cutter, so that the residual curvature, misalignment of the component parts, or any sharp departure from uniformity will have only a minor disturbing effect on the cut gauging mechanism, the frictional resistance resulting therefrom will unnecessarily increase the load on the feed motor of the automatic arc welding head.

It is an object of my invention to provide a cutter mechanism which automatically maintains a work cut of predetermined depth by adjusting the cutter relative to the work to compensate for the reduction in size of the cutter due to its wear.

It is a further object of my invention to provide such a cutter mechanism in which the gauging mechanism for controlling the cutter adjustment is bodily movable with the work projecting beyond the cutter, so that it is not necessary to confine the work in its passage beyond the cutter in order to get an accurate measurement of the depth of the cut and its variation with the wear of the cutter.

Further objects of my invention will become apparent from the following descriptions of one embodiment thereof illustrated in the accompanying drawings as a mechanism for cutting a longitudinal slot in flux coated arc welding electrodes so that welding current may be supplied thereto by a contact mechanism having brushes extending through the slot into engagement with the core of the electrode laid bare by the cutter mechanism.

Figure 8:
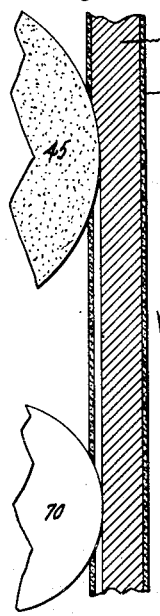
Figure 9:
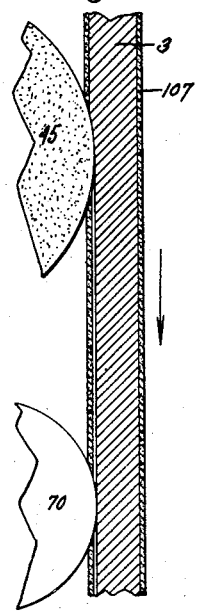
Figure 10:
Figure 6:
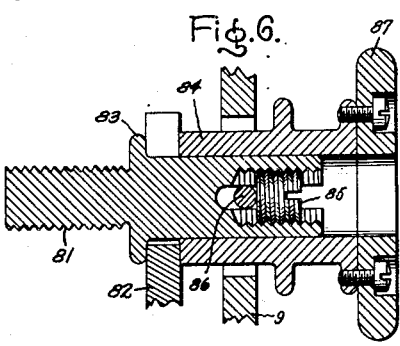

In these drawings, Fig. 1 is an illustration showing my cutter mechanism interposed between an automatic arc welding head and the contact mechanism used for supplying welding current through the cut portion of the electrode to its core rod. Figs. 2 and 3 are respectively side and top views of my cutter mechanism, with external portions thereof broken away in order to expose to view the cooperating parts thereof. Figs. 4 and 5 are respectively end and top views along the section lines a—a and b—b of Fig. 2. Fig. 6 is a detail view of one of the adjusting knobs of the cutter illustrated in the preceding figures, and Fig. 7 is a diagrammatic representation showing in perspective the relative arrangement of the essential elements of my cutter mechanism. Figs. 8 and 9 show the nature of the cut produced just after and just before an adjustment of the parts has occurred, and Fig. 10 is an exaggerated view of a longitudinal section at the cut produced on the core of the electrode, the length of the core being greatly foreshortened in order to illustrate the series of sloping surfaces produced at the bottom of the cut as a result of the intermittent adjustment of the cutter mechanism.

The particular embodiment illustrated in these drawings comprises a frame in which a guide and cutter are adjustably mounted opposite one another to accommodate the work which is the electrode fed therebetween by the feeding mechanism of the automatic arc welding head. The cutter is illustrated as a grinding wheel which is rotated by a motor, both of which are advanced toward the electrode in stepwise manner by the operation of a ratchet feeding mechanism whenever the depth of the cut produced in the electrode is less than a predetermined initial adjustment which it is desired to maintain. This ratchet mechanism is operated by an electromagnet in response to its periodic energization by a switch forming part of the gauging mechanism. This gauging mechanism is supported in the frame of the cutter mechanism for bodily movement with the electrode projecting beyond the grinding wheel. The gauging member, in addition to the switch previously mentioned, also embodies a gauging member and electrode engaging shoe which are biased toward one another. The arrangement is such that relative movement between the gauging member and shoe operates the switch whenever the depth of the cut produced by the grinding wheel is less than a pre-established value required for the best contact conditions between the core rod of the electrode and the brushes of the contact mechanism.

As shown in Fig. 1, my cutter mechanism 1 may be attached to an automatic arc welding head 2 in order to provide a longitudinal slot in a heavily coated electrode 3, so that welding current may be supplied thereto. One means of supplying the welding current to the electrode may be a contact mechanism 4 supported on the cutter mechanism and provided with brushes 5 which enter the slot produced by the cutter and make conductive contact with the core of the electrode fed therethrough by the welding head 2.

The welding head 2 may be of any suitable construction and, as illustrated, may embody the features of the welding head illustrated and described in U. S. Letters Patent 2,272,158, Jasper E. Anderson, granted February 3, 1942, and assigned to the assignee of this invention. In view of the description of the welding head contained in this patent, no further reference will herein be made, except to point out that it also constitutes a means for feeding the work or electrode 3 through the cutter mechanism 1.

The conact mechanism 4 may have various constructions and, as illustrated, is provided with the brushes 5 previously referred to which engage the core of the electrode and are connected to one terminal of a source of supply, the other terminal of which is connected to the work, not illustrated but normally positioned below the nozzle 6 of the contact mechanism. A heat shield 7 may be interposed between the nozzle 6 and the contact mechanism 4 in order to protect this mechanism from the heat of the welding arc. As illustrated in Fig. 1, the electrode 3 has not yet been advanced through the contact mechanism or nozzle 6 thereof. It is, however, positioned between the feed rolls 8 of the welding head 2 and extends through the cutter mechanism 1.

Referring now to Figs. 3 to 7 inclusive, it will be noted that the cutter, work guide, and slot gauging means of the cutter mechanism 1 are enclosed in a box 9 having projecting portions 10 and 11 for supporting the cutter motor 12 and the ratchet feed mechanism 13. A mounting plate 14 attached to the top of the projecting portion 10 of the frame of the cutter mechanism is employed for attaching the cutter mechanism to the supporting boss 15 of the welding head shown in Fig. 1.

The cutter motor 12 is attached to a slide 16 having beveled edge portions supported in grooved guides 17 and 18 attached to the framework of the cutter mechanism. The guide 18 is fixed in its position on the frame but the guide 17 may be moved relative to the portion 10 of the frame and is attached thereto by bolts 19 extending through slots in the outer edge of the portion 10 of the frame. An arm 20 also attached to the same edge of the portion 10 of the frame is provided with a set screw 21 which engages the movable guide 17 and adjusts its position relative to portion 10 of the frame before the bolts 19 are tightened in order to fix the location of the slide 17 on the portion 10 of the frame.

The motor-supporting slide 16 is provided with a nut 22, which is threaded on a screw shaft 23 forming part of the ratchet feed mechanism. Shaft 23 is journaled in a collar 24 which is attached to the front face of member 11 of the frame of the cutter mechanism. A ratchet wheel 25 is attached to that portion of the shaft 23 projecting beyond the collar 24 and is engaged by a ratchet 26 mounted on an arm 27 which is journaled about an outer peripheral surface of the collar 24. The ratchet 26 is biased to a position out of engagement with the ratchet wheel 25 or to a position in engagement with the ratchet wheel 25 by means of a spring 28 the outer end of which engages flat surfaces of the hub of the ratchet 26. The spring 28 is supported on a block 29 which is pivotally supported at 30 on the ratchet carrying arm of lever 27 and the tension of the spring 28 may be controlled by adjusting block 29 by means of a screw 31 the end of which engages block 29 beyond its pivotal support. This screw 31 is mounted on arm 27 by means of a nut 32 with which it makes a threaded engagement.

The ratchet supporting arm of the lever 27 is biased to a predetermined position relative to the frame of the cutter mechanism by means of a spring 33 one end of which abuts against a bracket 34 forming part of the frame and the other end of which abuts against a washer 35 which is adjustably positioned on a rod 36 extending through a slot in the bracket to a yoke member 37 which straddles the ratchet biasing spring 28 and has its ends pivotally attached at 38 to arm 27. The ratchet supporting arm of the lever 27 is moved against this bias by motion imparted thereto through a link 39 one end of which is attached to the operating arm of the lever 27 and the other end of which is attached to the core 40 of an electromagnet 41. This electromagnet is provided with an operating coil 42 which, when energized, moves the lever to operate the ratchet mechanism and feed the motor 12 relative to the frame in a direction toward the work or welding electrode 3. The electromagnet 41 is mounted on a bracket 43 attached to the bottom edge portion of the box portion 9 of the cutter frame. It is enclosed by a detachable cover 44.

In the particular arrangement illustrated, the cutter is a thin, disk-type grinding wheel 45 which is mounted on the end of the shaft 46 of motor 12. This shaft projects through an elongated slot 47 in the box portion 9 of the cutter frame so that the motor, its shaft and the grinding wheel thereon may be adjusted relative to this frame.

The electrode 3 is guided past the grinding wheel 45 by a mechanism mounted on a bracket 49 one end of which is attached to an end wall of the box portion 9 of the cutter frame and the other end of which is steadied by an internal rib 50 located within the box and provided with arms for adjusting screws 51 the ends of which engage opposite sides of the end of the bracket 49, as best illustrated in Fig. 2.

This guide mechanism comprises a grooved backing roll 52 located opposite the grinding wheel 45 and a plurality of disks 53 having their outer edge surfaces beveled to engage the electrode 3 on opposite sides of the grinding wheel 45. The backing roll 52 and disks 53 are mounted for rotation in a slide 54 which is supported by guides 55 forming part of the bracket 49. The backing roll 52 is located in a slot in the slide 54 for rotation on a shaft the ends of which are mounted in opposite side walls of the slot. The disks 53 are supported on shafts 56 extending into bearings located in the slide 54. The disks 53 are biased toward the backing roll 52 by a forked member 57 having ball-tipped bearing members 58 which engage centrally disposed bearing surfaces in the faces of the disks 53. The unforked end of member 57 is free to move between pins 59 on a bracket 60 which is attached to the slide 54. Springs 61 having their ends respectively attached to bracket 60 and the forked arms of lever 57 produce the bias by means of which the disks 53 are urged toward the backing roll 52.

The backing roll 52 is moved relative to bracket 49 and the cutter frame of which 49 forms a part, by adjusting its supporting slide 54 lengthwise thereof. This adjustment is accomplished by a hand wheel 62 which, by means of a shaft 63, rotates an externally threaded screw member 64 making threaded engagement with an internally threaded ring 65 attached to the end wall of bracket 60 which is adjacent the side wall of box 9 through which the shaft 63 extends. The hand wheel 62, shaft 63, and screw member 64 are mounted for rotation in the side wall of the box 9 of the cutter frame, and the rotation of these members causes the ring member 65 attached to slide 54 by bracket 60 to move this slide lengthwise of the bracket 49 also attached to the box portion 9 of the cutter frame. A shoulder on shaft 63 and a side surface of screw member 64 engage opposite sides of the wall of box 9 through which shaft 63 extends so as to prevent lateral displacement of these members when screw member 64 produces by its rotation a lateral adjustment of ring 65 and slide 54 to which it is attached. Movement of slide 54, of course, positions the backing roll 52 relative to the box portion 9 of the cutter frame. A dial and pointer mechanism 66 may be provided for indicating the adjustment of the backing roll 52.

The mechanism for gauging the depth of the slot 67 cut in the electrode 3 by the grinding wheel 45 is mounted on a supporting frame 68. This supporting frame 68 is mounted for swinging movement in the plane of rotation of the grinding wheel 45 by links 69 opposite ends of which are respectively pivotally supported on the guide bracket 49 and supporting frame 68.

The bottom cut surface of the slot 67 in the electrode 3 is engaged by a gauging member or caliper roll 70 supported for rotation with but electrically insulated from a shaft 71 the ends of which are mounted for rotation in the arms 72 of a forked member 73 which is biased toward the supporting frame 68 by means of springs 74. One end of each of these springs is attached to pins 75 mounted on opposite sides of the supporting frame 68 and the other end is attached to the ends of a bar 76 pivotally attached to a flanged portion of the forked member 73. The arms 72 of the forked member are pivotally supported on projecting ears 77 forming part of the side walls of the channel-shaped supporting frame 68.

The side of the electrode 3 opposite the slot 67 cut therein is supported by a shoe which, in the arrangement illustrated, is a grooved roll 78 mounted for rotation in an angular-shaped member 79 which is mounted on and adjustable lengthwise of the flanged support 68. This adjustment is accomplished by means of a nut 80 forming part of member 79 and a screw 81 making threaded engagement therewith. This screw 81 forms part of an assembly, as shown in Fig. 6, which is rotatably mounted in a flanged portion 82 of the support 68 for rotation relative thereto. The flanged portion 82 of the support 68 is engaged by the shoulder 83 of screw member 81 and the inner end of a sleeve 84 which fits over and is supported on the outer end of the screw 81. This outer end of screw 81 is slotted and tapped for an adjusting screw 85 which engages a pin 86 supported by and extending through the opening in sleeve 84. Thus by adjusting the screw 85, the screw 81 and sleeve 84 may be moved relative to one another to bring the inner end of sleeve 84 and the shoulder 83 of screw 81 into snug engagement with the slotted portion 82 of the support 68, thereby compensating for wear and eliminating backlash between the screw assembly and frame 68. The sleeve 84 may be provided at its outer end with a hand wheel 87.

Although not previously so described, the members 63, 64 and 65 for adjusting slide 54 also embody the same structural features illustrated in Fig. 6. This construction is also used for attaching ratchet wheel 25 to threaded shaft 23 by means of which the motor 12 is adjusted on the frame of the cutter mechanism. This construction is indicated in Fig. 7 of the drawings.

The arms 88 of a forked member 89 are pivotally supported on projecting ears 77 of frame 68 about the same pins which act as a pivotal support for arms 72 of forked member 73. The arms 88 of forked member 89 normally engage an abutment 90 attached to the arms 72 of forked member 73 by reason of the bias imparted thereto by springs 91 connected between the arms 88 of forked member 89 and the base portion of the support 68. Thus movement of the roll 70 and the arms 72 of forked member 73 imparts a corresponding movement to the forked member 89 until this member engages an adjustable stop, shown as a nut, 92 mounted in the upturned end of the angular member 79. When, however, the caliper roll 70 moves away from the electrode 3 a sufficient distance so that forked member 89 engages stop 92, further movement of the caliper roll 70 may occur without imparting further movement to the forked member 89. Forked member 89 thus constitutes, in effect, one arm of a lever the other arm of which is formed by forked member 73 which supports caliper roll 70, and these arms are yieldingly biased toward one another so that one rests against the abutment provided on the other.

The pivotal mounting of forked member 89 is such that its free end may be brought into and out of engagement with the operating member 93 of a switch 94 mounted between the flanged portions of the supporting member 68. When the forked member 89 makes an operating engagement with member 93 of switch 94, this switch closes its contacts, completing a circuit through conductors 95 from supply conductors 96 to the operating coil 42 of the electromagnet 41, as shown in Fig. 7 of the drawings. The grinding wheel motor 12 is also connected with the supply conductors 96 through conductors 97.

In order to impart great sensitivity to the gauging control of which switch 94 forms a part, it is desirable to use a switch of the character described in U. S. Letters Patent 1,960,020, Philip K. McGall, granted May 22, 1934. Switches of the character disclosed in this patent will operate in response to movements of about one thousandth of an inch. The distance of the switch operating member 93 from the common pivotal supports for forked members 89 and 73 is about two times the distance of shaft 71 for caliper roll 70 from the same common pivotal supports. Consequently the caliper roll 70 need move only one-half thousandth of an inch to operate the switch 94 which, as previously stated, is responsive to movements of one thousandth of an inch. Therefore, variations of the order of one-half thousandth of an inch in the depth of the cut produced in the electrode or work part will cause the caliper mechanism above described to operate its ratchet feeding mechanism to advance the grinding wheel 45 toward the electrode an amount sufficient to reestablish an initial adjustment of the grinding wheel that produces the desired depth of cut.

The grinding wheel, work guide, and caliper mechanism are all enclosed within the box portion 9 of the frame of the cutter mechanism. The front side wall of this cutter mechanism is provided with two windows in order to afford access to the interior of the box portion 9. These windows are closed by a cover 98 which is hinged on and supported by the box portion 9 of the frame. This cover is provided with a transparent window pane 99 through which the operator may inspect the operation of the parts enclosed within the box portion 9 and examine the condition of the grinding wheel 45. This cover 98 is held in its closed position by a latch 100 which engages a catch 101 respectively mounted on the cover and the box portion 9 of the frame. This cover 98 is also provided with a handle 102 a portion of which is illustrated in Fig. 4 and all of which is illustrated in Fig. 1. The operating knobs 62 and 87 for the guide and calipering means may also be enclosed by a cover 103 which is hinged on the box portion 9 of the frame and provided with a latch for holding it in its closed position.

With the cover 98 in its closed position, the enclosure of the box portion 9 is completed except for certain openings therein for the electrode, adjusting members, wiring conduit and the like so that the dust produced by the grinding operation is confined therein. This dust may be removed by means of a hood 104 extending over the grinding wheel 45 and connected with an exhaust conduit 105 which may carry the dust-laden air to a suitable separator in which the dust is collected.

As the electrode 3 is fed through the cutter mechanism above described, it is supported on the backing roll 52 of the work guide mounted on the bracket 49 and in a position opposite the cutting surface of the guiding wheel 45 which is rapidly rotated by the electric motor 12. The work guide may be adjusted relative to the cutting surface of the grinding wheel by means of the hand wheel 62. The grinding wheel may be positioned relative to this work guide by an adjustment of the ratchet feeding mechanism which may be accomplished by proper rotation of the ratchet wheel 25 by means of its handle 100. These two adjustments will initially determine the depth of the cut produced in the electrode 3 by the grinding wheel 45 which preferably extends into the core rod about ten to fifteen thousandths of an inch. The depth of the cut is measured by the calipering means swingingly supported on the work guide and comprising the gauging member 70 previously identified as a caliper roll. This roll is thin enough to freely enter the slot cut into the electrode and engage the bottom of the cut which extends into the core of the electrode through the flux coating thereon. The caliper roll operates in conjunction with the shoe or roll 78 of this calipering mechanism to measure the thickness of the electrode between the bottom of the slot cut therein and the opposite surface thereof.

When the diameter of the grinding wheel 45 is reduced due to wear, the depth of the cut in the electrode 3 decreases and the caliper roll 70 will consequently move away from the shoe roll 78 and impart movement to the forked member 89 which, in turn, will operate the switch 94 forming part of the calipering means. The arrangement is such that upon each operation thereof the ratchet feeding mechanism advances the grinding wheel an amount sufficient to cause the switch 94 to again open its contacts. Excessive displacement of the gauging member 70 away from its cooperating member 78 due to some casual obstruction, such as may result from non-adjustment or breakage of the grinding wheel, prevents damage to the switch 94 or other parts of the gauging mechanism since said overtravel is not positively transmitted to the forked member 89, which is stopped in its movement after it has engaged and moved the switch operating member 93 a distance sufficient to operate switch 94.

The grinding wheel 45 may have an initial size of about eight inches in diameter and may be rotated at speeds of about 3400 revolutions per minute by its motor 12. The width of the grinding wheel may be one sixteenth of an inch for electrodes having a core rod one-half inch in diameter. In accordance with one arrangement I have used, the last half thousandth of an inch decrease in the depth of the slot cut into the electrode by the grinding wheel causes the switch 94 to operate the electrode feeding mechanism which advances the grinding wheel about one and one-half thousandths of an inch. With such an arrangement the slot produced in the electrode will vary in depth by one and one-half thousandths of an inch.

The nature of the cuts produced is exaggerated in the illustrations of Figs. 8 and 9, Fig. 8 showing the adjustment immediately after the ratchet feeding mechanism has operated and Fig. 9 showing an adjustment immediately before the ratchet feeding mechanism operates. In Figs. 8 and 9 the coating on the electrode 3 has been illustrated at 107. The periodic operation of the ratchet feed mechanism thus causes the grinding wheel 45 to produce a series of sloping cuts such as illustrated in Fig. 10, which, as previously stated, is an exaggerated view in which the flux on the electrode has not been shown and the length of the core rod of the electrode has been greatly foreshortened in order to illustrate the nature of these sloping cuts. The ratchet feeding mechanism may operate about once to every eighteen inches of electrode feed, and the difference in slot depth of one and one half thousandth of an inch produced after each operation thereof in no way interferes with the sliding of the brushes 5 of the contact mechanism 4 over this cut surface. In fact, the smoothness of the cut makes it possible for the brushes of the contact mechanism to make such a satisfactory contact with the core of the electrode that their current carrying capacity without arcing is very greatly increased. Furthermore the smoothness of the side walls of the cut is such that no interference is encountered in passing by the brushes of the contact mechanism. As a further advantage, the cut through the flux 107 on the electrode 3 is made under conditions that in no way interfere with the bond between the coating and the core of the electrode, so that the remaining flux coating firmly adheres to the electrode until it reaches the arcing terminal thereof and performs its functions previously described.

By supporting the gauging or calipering means for bodily movement with the electrode and relative to the cutter and work guide in directions normal to the surface of the cut produced in the electrode by the cutter, any residual curvature in the electrode will not produce a false adjustment of the cutter. This is accomplished by permitting the portion of the electrode projecting beyond the cutter and work guide to assume its natural position and having the gauging means bodily follow the work rather than impose a positive drag on the electrode by restraining its travel to a predetermined path past a gauging means having a fixed position relative to such path. Furthermore when the electrode is made up of short lengths joined together at their ends, any misalignment of these component parts will not cause a false response of the gauging means, as might occur if the resulting electrode were confined in its movement to a positive path past a gauging means fixed in a predetermined position relative to this path.

It is, of course, obvious that variations may be made in the cutter mechanism above described without in any way departing from the spirit and scope of my invention. Thus instead of the electrode or work guide above described, a more simple form may be used. The structure and support of the electrode shoe of the gauging mechanism may also be simplified and a relative adjustment between this shoe and the control switch other than that illustrated may be employed. Other arrangements than those described may be provided for transmitting motion from the gauging member to the switch and permitting relative movement of the switch operating arm and the gauging member so as to permit overtravel of the gauging member without increasing travel of the switch arm. Means other than those illustrated may be employed for biasing the arms of the lever between the switch and gauging member. It is, of course, obvious that instead of the switch 94 above described, any suitable electric circuit controller may be substituted and that other suitable electric means may be employed in place of the electromagnet 41 and the particular ratchet mechanism 13 disclosed for adjusting the cutter and work support relative to one another. These and other equivalents for the parts of my cutter mechanism will occur to those skilled in this art. Thus while I have shown and described but one embodiment of my invention, it will be understood that I intend to cover by the appended claims all modifications of my invention which fall within the true spirit and scope thereof.

What I claim as new and desire to secure by Letters Patent of the United States is:

1. Apparatus comprising a cutter, a guide for positioning the work relative to said cutter to produce a cut surface on the work as it is moved past said guide and said cutter, means for feeding said cutter toward said guide and the work positioned thereon, means including members biased toward one another and respectively engaging said cut surface and another surface of said work for calipering the depth of said cut by the relative movement of said members, means for supporting said calipering means for bodily movement with the work at an unsupported portion thereof extending beyond said cutter and said guide, and means responsive to that relative movement of said members of said calipering means which occurs upon a predetermined decrease in the depth of said cut due to the wear of said cutter for operating said feeding means to reestablish an initial adjustment of said cutter and said guide that produces a predetermined desired depth of cut.

2. Apparatus comprising a cutter, a guide for positioning the work relative to said cutter to produce a cut surface on the work as it is moved past said guide and said cutter, means for feeding said cutter toward said guide and the work positioned thereon, means including members biased toward one another and respectively engaging said cut surface and another surface of said work at an unsupported portion thereof extending beyond said cutter and said guide for calipering the depth of said cut by the relative movement of said members, means for supporting said calipering means for movement with the work and relative to said cutter and said guide in directions normal to the surface of said cut, and means responsive to that relative movement of said members of said calipering means which occurs upon a predetermined decrease in the depth of said cut due to the wear of said cutter for operating said feeding means to reestablish an initial adjustment of said cutter and said guide that produces a predetermined desired depth of cut.

3. Apparatus comprising a frame, a guide and cutter mounted opposite one another in said frame and between which the work is moved to produce a cut surface thereon, a support, a work engaging shoe mounted on said support, a gauging member mounted on said support and biased toward said shoe into engagement with the cut surface of the work, a switch mounted on said support and having an operating element, another member movable into and out of engagement with said operating element of said switch in response to the movement of said gauging member, means for mounting said support in said frame for bodily movement with said shoe and the work engaged thereby, and means responsive to the operation of said switch by movement of said gauging member and said other member upon a predetermined decrease in the depth of said cut due to the wear of said cutter for reestablishing the initial adjustment of said cutter and said guide that produces a predetermined desired depth of cut.

4. Apparatus comprising a frame, a guide and cutter mounted opposite one another in said frame and between which the work is moved to produce a cut surface thereon, a support mounted in said frame for movement in directions normal to said cut surface, a work engaging shoe mounted on said support, a gauging member mounted on said support and biased toward said shoe into engagement with the cut surface of the work, a switch mounted on said support and having an operating element, another member movable into and out of engagement with said operating element of said switch, in response to the movement of said gauging member, and means responsive to the operation of said switch by movement of said gauging member and said other member upon a predetermined decrease in the depth of said cut due to the wear of said cutter for reestablishing the initial adjustment of said cutter and said guide that produces a predetermined desired depth of cut.

5. Apparatus comprising a frame, a guide and cutter mounted opposite one another in said frame, and between which the work is moved to produce a cut surface thereon, a support mounted in said frame for movement in directions normal to said cut surface, a work engaging shoe mounted on said support, a gauging member mounted on said support and biased toward said shoe into engagement with the cut surface of the work, an electric circuit controller mounted on said support and having an operating member, another member responsive to the movement of said gauging member for engaging the operating member of said circuit controller and thereby controlling the operation of said circuit controller, a ratchet feeding mechanism for advancing said cutter upon each operation thereof an amount sufficient to cause sufficient movement of said gauging member in response to the deeper cut to operate said circuit controller, electric means for operating said ratchet feeding mechanism, and means responsive to the operation of said circuit controller for energizing and deenergizing said electric means.

6. Apparatus comprising a grinding wheel, means for rotating said grinding wheel, a guide located opposite said grinding wheel for positioning the work relative thereto to produce a cut surface thereon as it passes between said guide and said grinding wheel, said work having an unsupported portion extending beyond said grinding wheel and said guide, means including members biased toward one another and respectively engaging the cut surface and another surface of the work at said unsupported portion thereof for calipering the depth of said cut by the relative movement of said members, means for supporting said calipering means for movement with said unsupported portion of the work and relative to said grinding wheel and said guide in the plane of rotation of said grinding wheel, and means responsive to that relative movement of said members of said calipering means which occurs upon a predetermined decrease in the depth of said cut due to the wear of said grinding wheel for reestablishing an initial adjustment of said grinding wheel and said guide that produces a predetermined desired depth of cut.

7. Apparatus comprising a frame, a work guide and grinding wheel mounted opposite one another in said frame and between which the work is moved to produce a cut surface thereon, means for rotating said grinding wheel, a support, a work engaging shoe mounted on said support, a gauging member mounted on said support and biased toward said shoe into engagement with the cut surface of the work, a switch mounted on said support and having an operating element, an arm mounted for movement with said gauging member into and out of engagement with said operating element of said switch, said arm being yieldingly movable relative to said gauging member to permit greater travel of said gauging member than that required to bring said arm into operating engagement with the operating element of said switch, means for mounting said support in said frame for bodily movement with said shoe and the work engaged thereby, and means responsive to the operation of said switch by movement of said arm and said gauging member upon a predetermined decrease in the depth of said cut due to the wear of said grinding wheel for reestablishing an initial adjustment of said grinding wheel and said guide that produces a predetermined desired depth of cut.

8. Apparatus comprising a frame, a work guide and grinding wheel mounted opposite one another in said frame and between which the work is moved to produce a cut surface thereon, means for rotating said grinding wheel, a work engaging shoe, a support therefor mounted in said frame for swinging movement in the plane of rotation of said grinding wheel, a gauging member mounted on said support and biased toward said shoe into engagement with the cut surface of the work, a switch mounted on said support and having an operating element, means for adjusting said shoe and said operating element of said switch relative to one another on said support, an arm mounted for movement with said gauging member into and out of engagement with said operating element of said switch, said arm being yieldingly movable relative to said gauging member to permit greater travel of said gauging member than that required to bring said arm into operating engagement with the operating element of said switch, and means responsive to the operation of said switch by movement of said arm and said gauging member upon a predetermined decrease in the depth of said cut due to the wear of said grinding wheel for reestablishing an initial adjustment of said grinding wheel and said guide that produces a predetermined desired depth of cut.

9. Apparatus comprising a grinding wheel, means for rotating said grinding wheel, a guide located opposite said grinding wheel for positioning the work as it is moved past said guide and the cutting surface of said grinding wheel to produce a cut surface thereon, a work engaging shoe, a support therefor mounted on and below said work support for swinging movement in the plane of rotation of said grinding wheel, a switch having an operating member, means for adjusting the relative position of said switch operating member and said shoe on said support, a lever arm having a pivotal mounting for movement toward and away from said shoe, a roll supported in said lever arm opposite said shoe for engaging the cut surface of the work, means for biasing said roll and said shoe toward one another, a cooperating lever arm supported on said pivotal mounting for movement into and out of engagement with said operating member of said switch, an abutment on one of said lever arms against which the other of said lever arms is yieldingly biased in a direction to permit relative movement of said lever arms after said switch operating lever arm has made an operating engagement with said operating member of said switch, a feeding mechanism for advancing said grinding wheel toward said guide and the work positioned thereon, and an electric means for operating said feeding mechanism in response to the operation of said switch.

10. Apparatus comprising a grinding wheel, means for rotating said grinding wheel, a guide located opposite said grinding wheel for positioning the work as it is moved past said guide and the cutting surface of said grinding wheel to produce a cut surface thereon, a work engaging shoe, a support therefor mounted on and below said work support for swinging movement in the plane of rotation of said grinding wheel, an electric circuit controller having an operating member, means for adjusting the relative position of said operating member of said circuit controller and said shoe on said support, a lever arm having a pivotal mounting for movement toward and away from said shoe, a roll supported in said lever arm opposite said shoe for engaging the cut surface of the work, means for biasing said roll and said shoe toward one another, a cooperating lever arm supported on said pivotal mounting for movement into and out of engagement with said operating member of said circuit controller, an abutment on one of said lever arms against which the other of said lever arms is yieldingly biased in a direction to permit relative movement of said lever arms after said circuit controller operating lever arm has made an operating engagement with said operating member of said circuit controller, a ratchet feeding mechanism for advancing said grinding wheel upon each operation thereof an amount sufficient to cause sufficient movement of said roller in response to the deeper cut to operate said circuit controller, and means responsive to the operation of said circuit controller for operating said ratchet feeding mechanism.

WAYNE E. WILSON.

REFERENCES CITED

The following references are of record in the file of this patent:

UNITED STATES PATENTS

| Number | Name | Date |
|---|---|---|
| 1,228,798 | Maag | June 5, 1917 |
| 1,954,442 | Dall et al. | Apr. 10, 1934 |
| 2,049,611 | Harrison et al. | Aug. 4, 1936 |
| 2,293,923 | Stewart et al. | Aug. 25, 1942 |
| 2,379,907 | Hubbard | July 10, 1945 |